(12) United States Patent
Latham et al.

(10) Patent No.: US 9,656,745 B2
(45) Date of Patent: May 23, 2017

(54) MAGNETORHEOLOGICAL ACTUATOR WITH TORSIONAL SPRING

(71) Applicant: Bell Helicopter Textron Inc., Fort Worth, TX (US)

(72) Inventors: Geoffrey C Latham, Dallas, TX (US); Albert G Brand, North Richland Hills, TX (US); Jean-Sébastien Plante, Sherbrooke (CA); Guifré Julio, Sherbrooke (CA); Marc Denninger, Sherbrooke (CA)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 14/960,482

(22) Filed: Dec. 7, 2015

(65) Prior Publication Data

US 2016/0221674 A1 Aug. 4, 2016

Related U.S. Application Data

(63) Continuation-in-part of application No. 14/609,905, filed on Jan. 30, 2015.

(51) Int. Cl.
*B64C 27/64* (2006.01)
*B64C 27/56* (2006.01)
*B64C 27/68* (2006.01)

(52) U.S. Cl.
CPC .............. *B64C 27/64* (2013.01); *B64C 27/56* (2013.01); *B64C 27/68* (2013.01)

(58) Field of Classification Search
CPC ......... B64C 19/00; B64C 13/08; B64C 13/46; B64C 27/04; B64C 27/12; B64C 27/51; B64C 27/56; B64C 27/64; B64C 27/68
See application file for complete search history.

(56) References Cited

U.S. PATENT DOCUMENTS 2,383,779 A 8/1945 Dobmeier
2,857,776 A 10/1958 Steere
(Continued)

FOREIGN PATENT DOCUMENTS

JP 2014173697 9/2014

OTHER PUBLICATIONS

Notice of Allowance in related U.S. Appl. No. 14/482,646, dated May 27, 2016, 12 pages.
(Continued)

*Primary Examiner* — Valentina Xavier

(57) ABSTRACT

According to one embodiment, a trim actuator for a pilot input device includes a driven member and a driving member configured to receive mechanical energy from a power source. A magnetorheological (MR) fluid is disposed between the driving member and the driven member and configured to transmit a variable amount of mechanical energy from the driving member to the driven member such that the driven member moves in a first direction. An output member configured to be coupled between the driven member and the pilot input device. A spring is in mechanical communication with the output member and configured to apply a force in a second direction opposite of the first direction. A magnetic circuit is configured to control movement of the pilot input device by varying the strength of a magnetic field delivered towards the first MR fluid.

20 Claims, 11 Drawing Sheets

(56) References Cited

U.S. PATENT DOCUMENTS

| | | | |
|---|---|---|---|
| 4,730,503 A | 3/1988 | Rosenthal | |
| 5,647,245 A | 7/1997 | Takei | |
| 6,183,386 B1* | 2/2001 | Duggan | F16D 37/02 |
| | | | 192/21.5 |
| 6,254,037 B1* | 7/2001 | Fenny | B64C 13/46 |
| | | | 244/221 |
| 6,373,465 B2 | 4/2002 | Jolly et al. | |
| 6,486,872 B2* | 11/2002 | Rosenberg | A63F 13/06 |
| | | | 200/6 A |
| 6,953,108 B2* | 10/2005 | Anderfaas | F16F 9/535 |
| | | | 188/267.2 |
| 2003/0134707 A1* | 7/2003 | Goldie | B60K 7/0007 |
| | | | 475/149 |
| 2003/0155201 A1 | 8/2003 | Bowen | |
| 2005/0201863 A1 | 9/2005 | Welsh | |
| 2005/0269887 A1 | 12/2005 | Blanding | |
| 2006/0009891 A1* | 1/2006 | Pawlak | F16F 9/535 |
| | | | 701/37 |
| 2007/0257552 A1* | 11/2007 | Hehl | F16D 27/115 |
| | | | 303/119.2 |
| 2008/0115061 A1* | 5/2008 | Larson | B64C 13/04 |
| | | | 715/702 |
| 2008/0289440 A1 | 11/2008 | Denk | |
| 2010/0059944 A1 | 3/2010 | Oteman | |
| 2010/0269604 A1 | 10/2010 | Fujiwara | |
| 2011/0045932 A1* | 2/2011 | Fauteux | B25J 9/102 |
| | | | 475/221 |
| 2013/0047772 A1* | 2/2013 | Shafer | B25J 19/06 |
| | | | 74/490.03 |
| 2013/0211631 A1* | 8/2013 | Yates | B64C 13/04 |
| | | | 701/3 |
| 2013/0313358 A1 | 11/2013 | Hale | |
| 2014/0085765 A1* | 3/2014 | Gurocak | F16F 9/53 |
| | | | 361/152 |
| 2014/0090937 A1* | 4/2014 | Wereley | B64C 27/51 |
| | | | 188/267.2 |
| 2014/0137679 A1 | 5/2014 | Pittini | |
| 2015/0083868 A1* | 3/2015 | Covington, Jr. | B64C 13/50 |
| | | | 244/227 |
| 2015/0107395 A1* | 4/2015 | Kermani | B25J 19/06 |
| | | | 74/490.03 |
| 2015/0217865 A1* | 8/2015 | Spina | B64C 27/08 |
| | | | 244/227 |

OTHER PUBLICATIONS

Office Action in related U.S. Appl. No. 14/482,603, dated Apr. 21, 2016, 10 pages.

Office Action in related U.S. Appl. No. 14/482,646, dated Jan. 20, 2016, 19 pages.

* cited by examiner

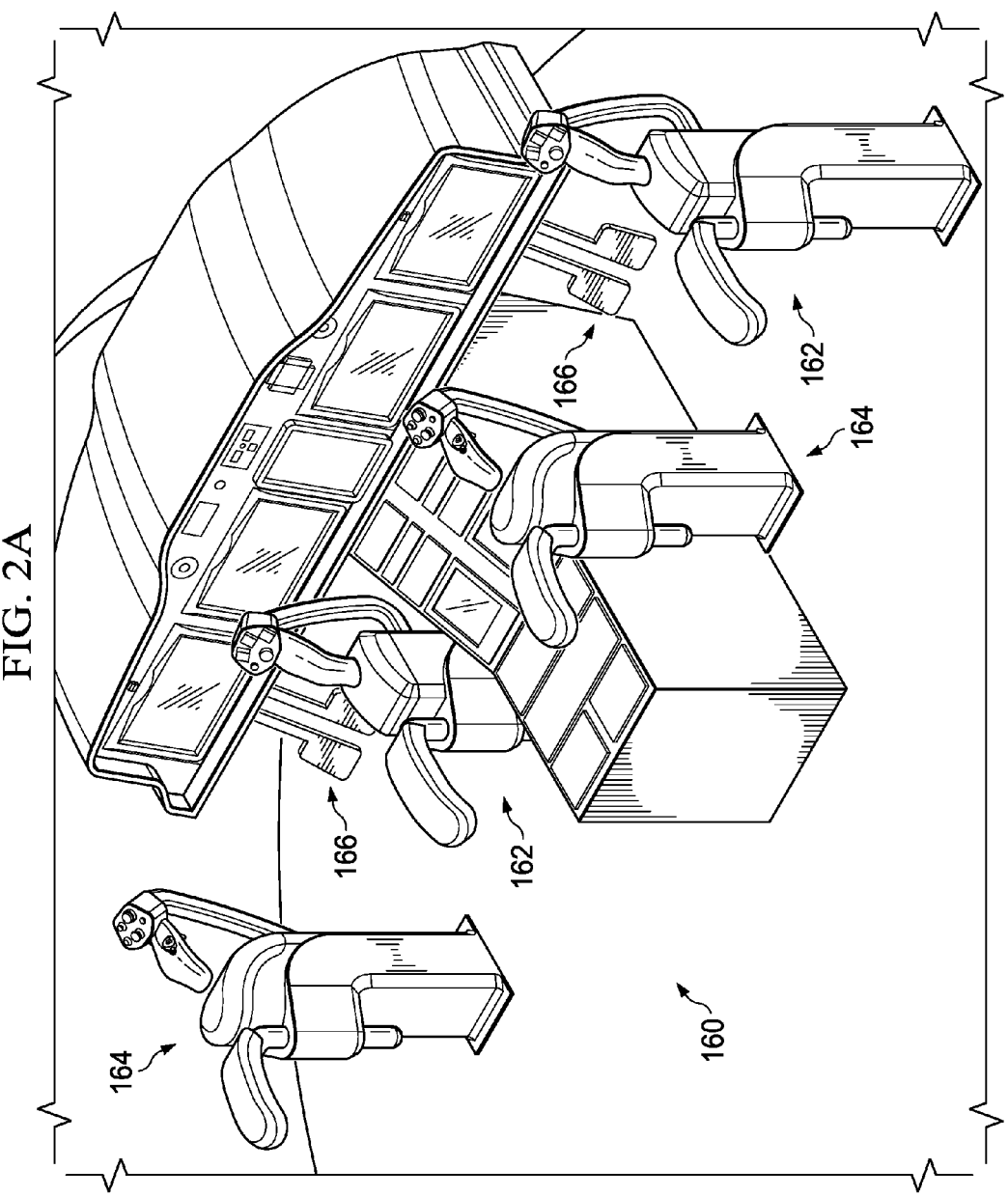

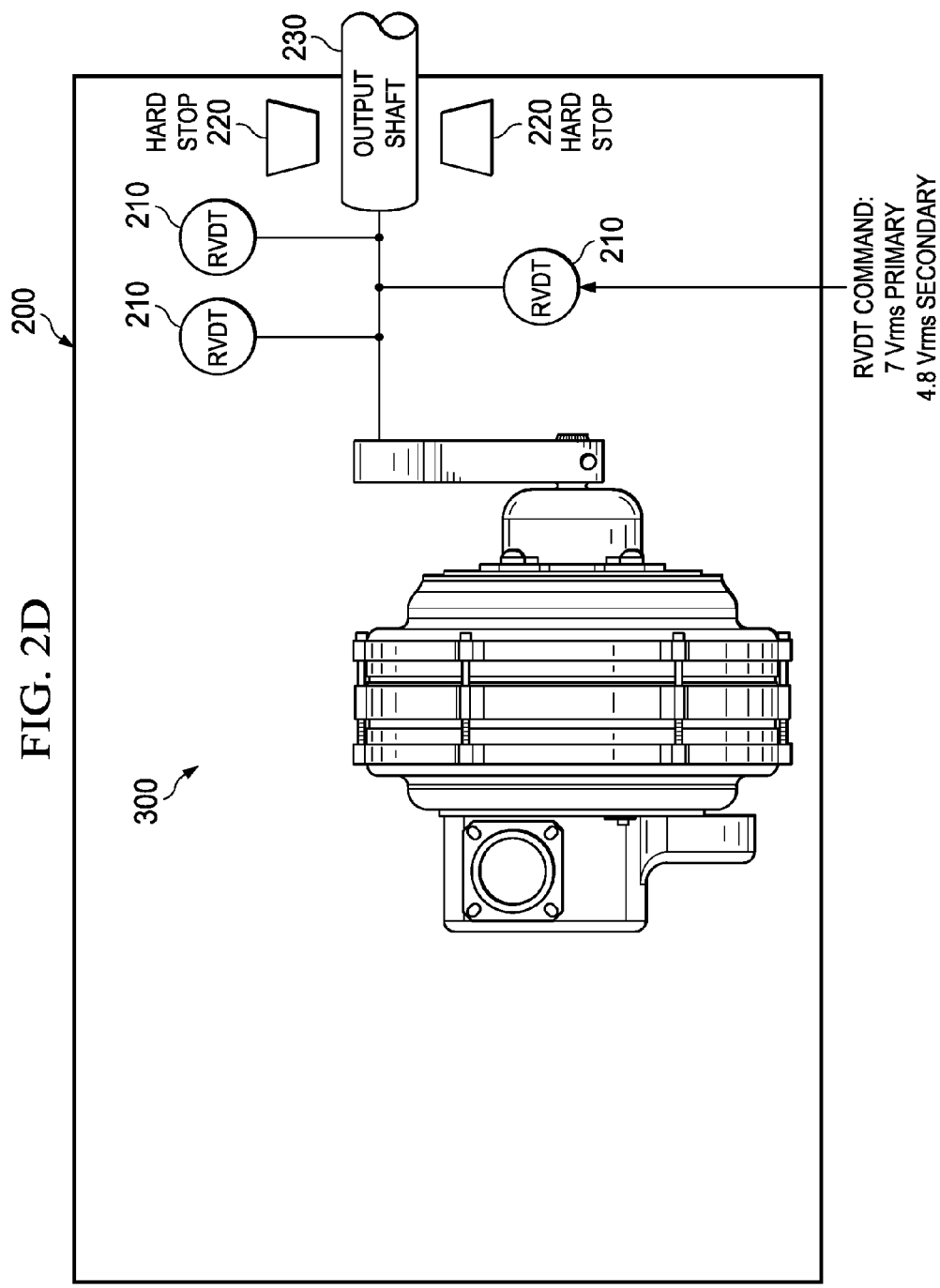

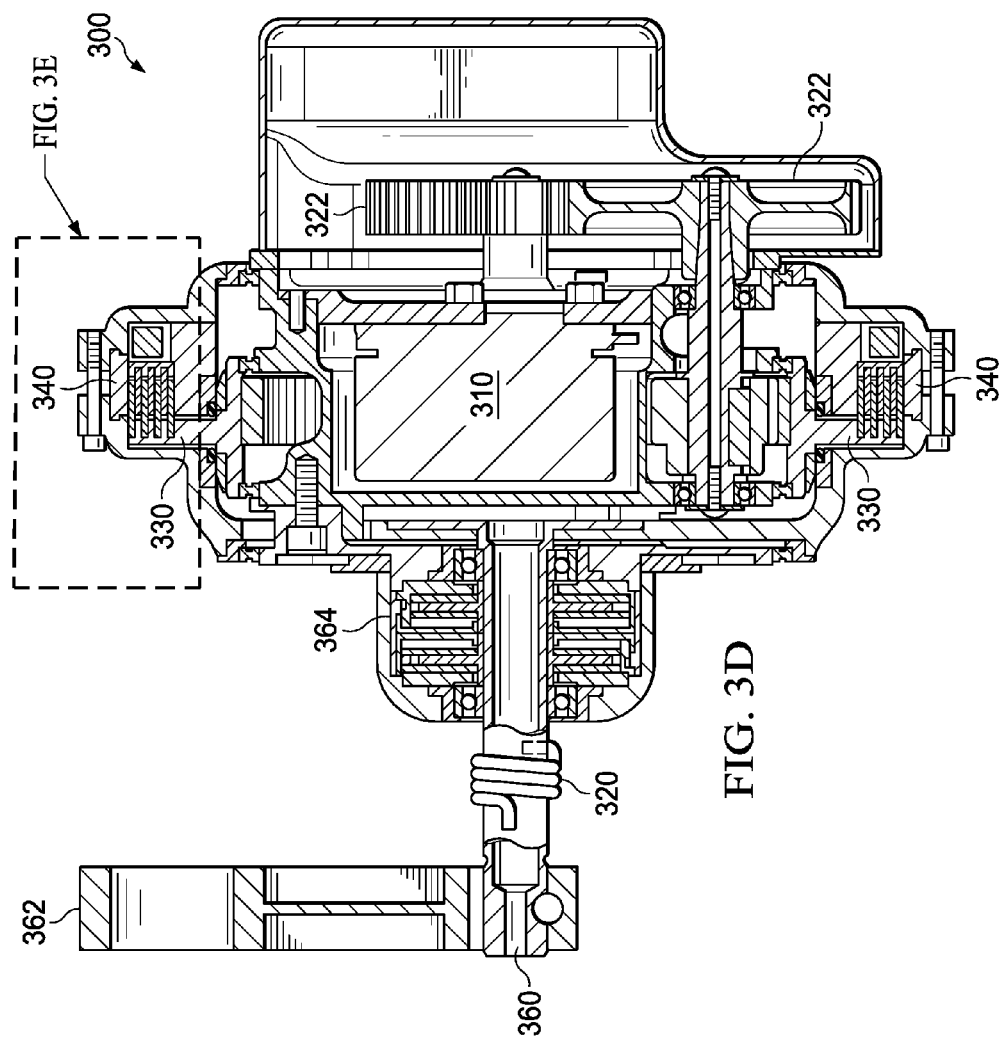

AXIS OF REVOLUTION

US 9,656,745 B2

MAGNETORHEOLOGICAL ACTUATOR WITH TORSIONAL SPRING

RELATED APPLICATIONS

Pursuant to 35 U.S.C. §120, this application claims priority as a continuation-in-part of U.S. patent application Ser. No. 14/609,905, entitled MAGNETORHEOLOGICAL HAPTIC TRIM ACTUATOR, filed Jan. 30, 2015. U.S. patent application Ser. No. 14/609,905 is hereby incorporated by reference.

TECHNICAL FIELD

This invention relates generally to aircraft flight control systems, and more particularly, to a magnetorheological actuator with torsional spring.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

SUMMARY

Particular embodiments of the present disclosure may provide one or more technical advantages. A technical advantage of one embodiment may include the capability to improve pilot control of an aircraft and reduce pilot workload. A technical advantage of one embodiment may include the capability to provide a lighter-weight actuator device.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 2A shows a cockpit configuration of the rotorcraft of FIG. 1 according to one example embodiment;

FIG. 2D shows an example view of the trim assemblies of FIGS. 2B and 2C according to one example embodiment;

FIG. 3D shows a cross-section view of the MR fluid clutch actuator of FIG. 3A;

DETAILED DESCRIPTION OF THE DRAWINGS

Figure 1:
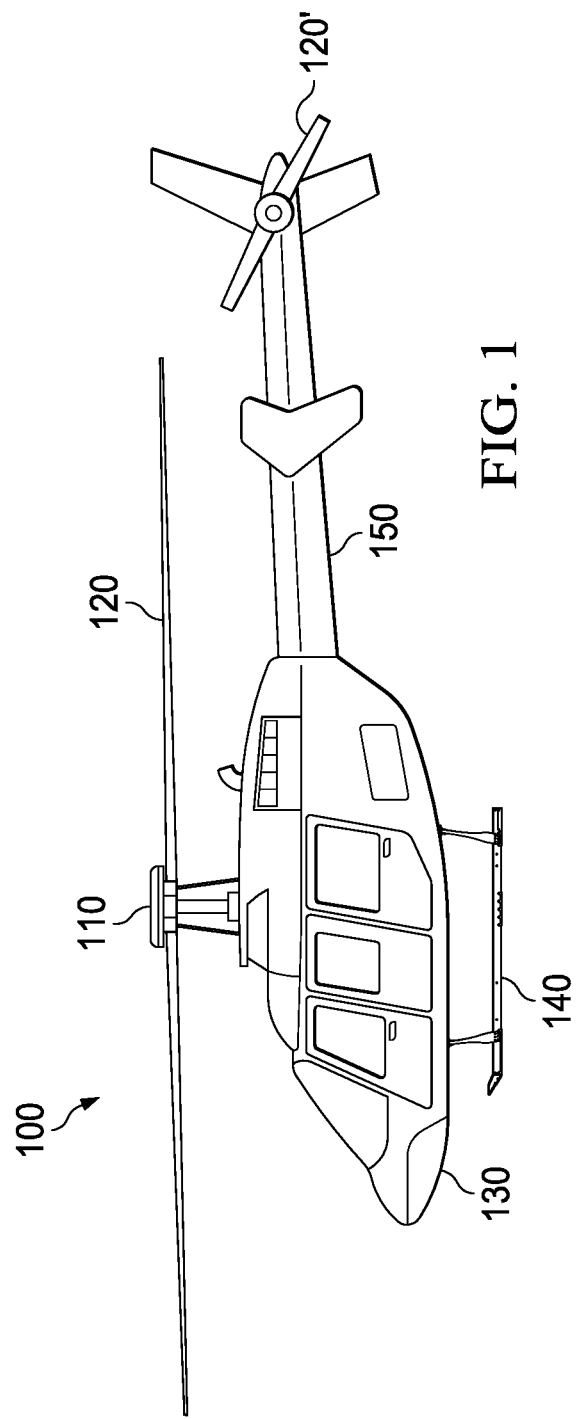
FIG. 1 shows a rotorcraft according to one example embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings from rotorcraft 100 may apply to aircraft other than rotorcraft, such as airplanes and unmanned aircraft, to name a few examples.

A pilot may manipulate one or more pilot flight controls in order to achieve controlled aerodynamic flight. Inputs provided by the pilot to the pilot flight controls may be transmitted mechanically and/or electronically (e.g., via a fly-by-wire flight control system) to flight control devices. Flight control devices may represent devices operable to change the flight characteristics of the aircraft. Examples of flight control devices on rotorcraft 100 may include the control system operable to change the positions of blades 120 and blades 120'.

FIG. 2A shows a cockpit configuration 160 of rotorcraft 100 according to one example embodiment. In the example of FIG. 2A, rotorcraft 100 features at least three sets of pilot flight controls: cyclic control assemblies 162, collective control assemblies 164, and pedal assemblies 166. In the example of FIG. 2A, a set of each pilot flight control is provided for a pilot and a co-pilot (both of which may be referred to as a pilot for the purposes of this discussion). Although the example of FIG. 2A and other examples discussed herein describe pilot flight controls such as cyclic control assemblies, collective control assemblies, and pedal assemblies, teachings of certain embodiments recognize that other pilot flight controls may be used. For example, in some embodiments, a tiltrotor aircraft may include a power control device and a thrust control device.

In general, cyclic pilot flight controls may allow a pilot to impart cyclic motions on blades 120. Cyclic motions in blades 120 may cause rotorcraft 100 to tilt in a direction specified by the pilot. For tilting forward and back (pitch) and/or tilting sideways (roll), the angle of attack of blades 120 may be altered cyclically during rotation, creating different amounts of lift at different points in the cycle.

Collective pilot flight controls may allow a pilot to impart collective motions on blades 120. Collective motions in blades 120 may change the overall lift produced by blades 120. For increasing or decreasing overall lift in blades 120, the angle of attack for all blades 120 may be collectively altered by equal amounts at the same time resulting in ascents, descents, acceleration, and deceleration.

Anti-torque pilot flight controls may allow a pilot to change the amount of anti-torque force applied to rotorcraft 100. As explained above, blades 120' may provide thrust in the same direction as the rotation of blades 120 so as to counter the torque effect created by rotor system 110 and blades 120. Anti-torque pilot flight controls may change the amount of anti-torque force applied so as to change the heading of rotorcraft 100. For example, providing anti-torque force greater than the torque effect created by rotor system 110 and blades 120 may cause rotorcraft 100 to rotate in a first direction, whereas providing anti-torque force less than the torque effect created by rotor system 110 and blades 120 may cause rotorcraft 100 to rotate in an opposite direction. In some embodiments, anti-torque pilot flight controls may change the amount of anti-torque force applied by changing the pitch of blades 120', increasing or reducing the thrust produced by blades 120' and causing the nose of rotorcraft 100 to yaw in the direction of the applied pedal. In some embodiments, rotorcraft 100 may include additional or different anti-torque devices (such as a rudder or a NOTAR anti-torque device), and the anti-torque pilot flight controls may change the amount of force provided by these additional or different anti-torque devices.

In some embodiments, cyclic control assembly 162, collective control assembly 164, and pedal assemblies 166 may be used in a fly-by-wire flight control system. In the example of FIG. 2A, each cyclic control assembly 162 is located to the right of a pilot seat, each collective control assembly 164 is located to the left of a pilot seat, and pedal assembly 166 is located in front of a pilot seat. Teachings of certain embodiments recognize that cyclic control assemblies 162, collective control assemblies 164, and pedal assemblies 166 may be located in any suitable position.

In some embodiments, cyclic control assembly 162, collective control assembly 164, and pedal assemblies 166 may in mechanical communication with trim assembly boxes that convert mechanical inputs into fly-by-wire flight control commands. These trim assembly boxes may include, among other items, measurement devices for measuring mechanical inputs and trim motors for driving the center positions of the cyclic control assembly 162, collective control assembly 164, and/or pedal assemblies 166.

Figure 2B:
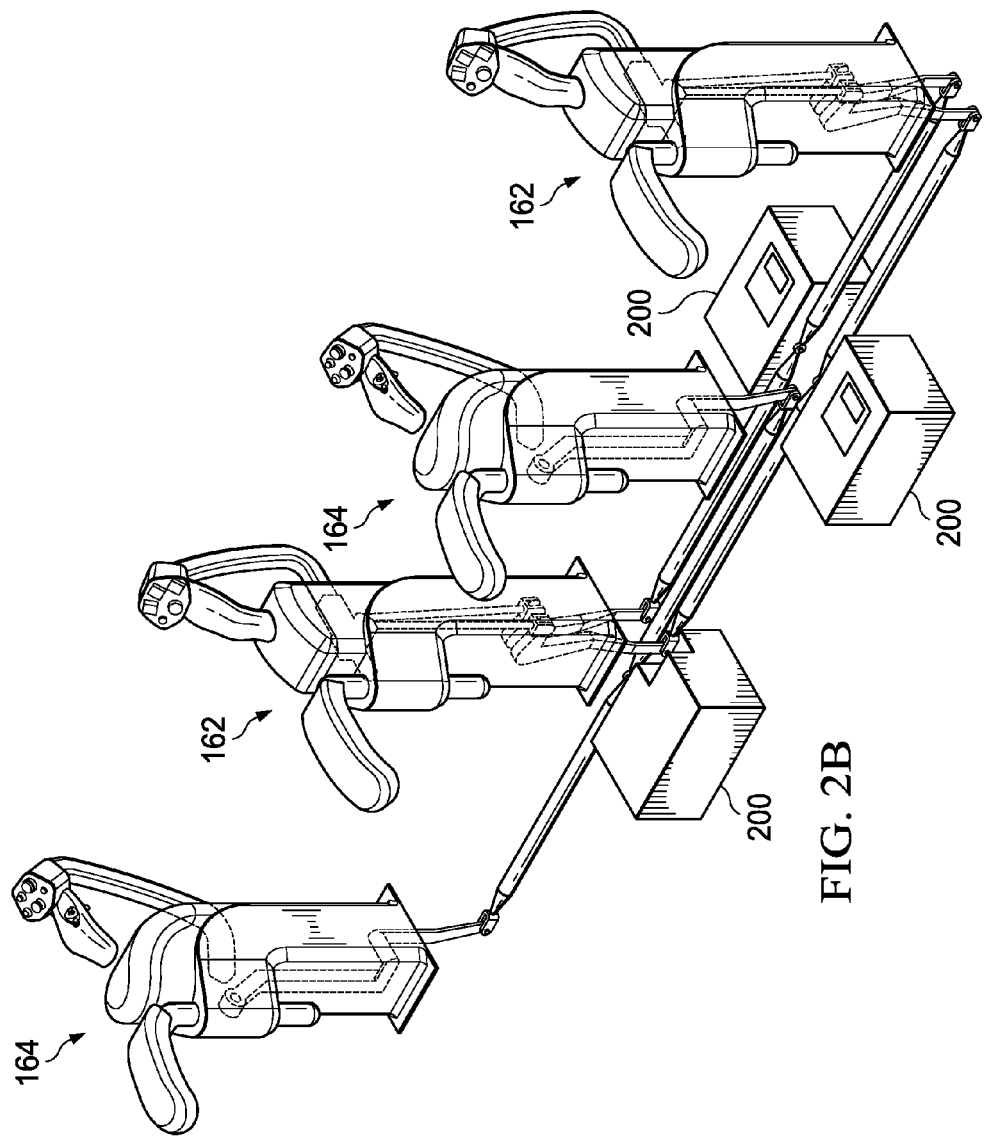
FIG. 2B shows an installation of two cyclic control assemblies and two collective control assemblies of FIG. 2A according to one example embodiment.

For example, FIG. 2B shows an installation of two cyclic control assemblies 162 and two collective control assemblies 164 according to one example embodiment. In this example, the two cyclic control assemblies 162 and two collective control assemblies 164 are coupled to three integrated trim assemblies 200. One of the trim assemblies 200 manages left/right cyclic tilting movements, another trim assembly 200 manages front/back cyclic tilting movements, and the third manages collective movements.

In the example of FIG. 2B, trim assemblies 200 are operable to receive and measure mechanical communications of cyclic and collective motions from the pilot. In this example, cyclic trim assemblies 200 may represents components in a fly-by-wire flight control system, and the measurements from cyclic trim assemblies 200 may be sent to a flight control computer operable to instruct rotor system 100 to change a position of blades 120 based on the received measurements. For example, the flight control computer may be in communication with actuators or other devices operable to change the position of blades 120.

Figure 2C:
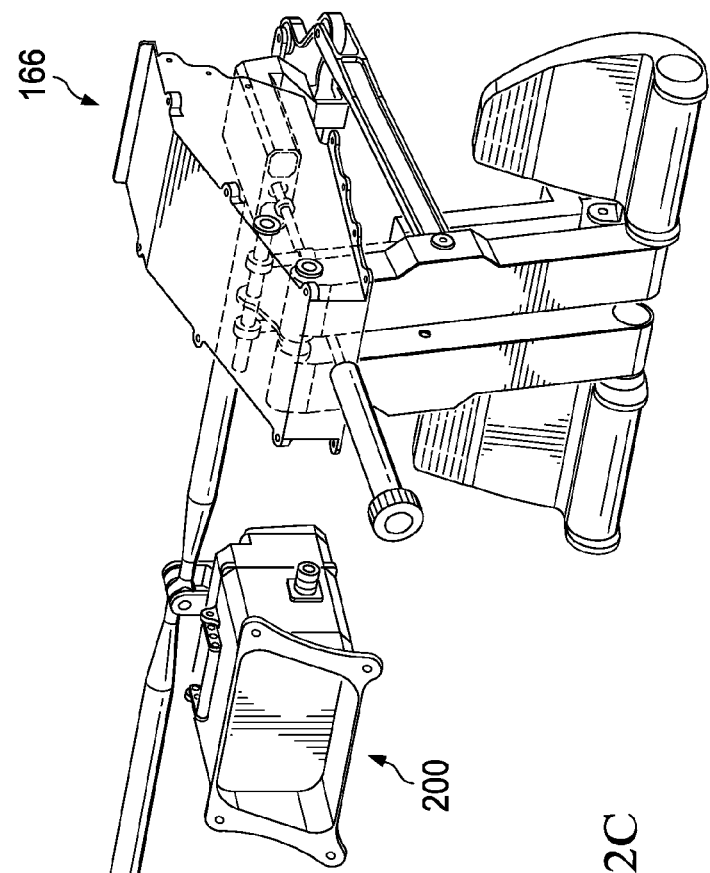
FIG. 2C shows an installation of two pedal assemblies of FIG. 2A according to one example embodiment.
Figure 2C:
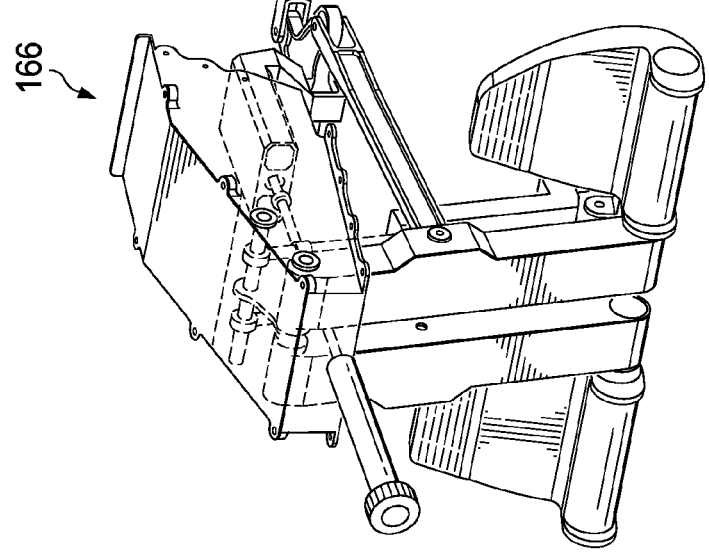

As another example, FIG. 2C shows an installation of pedal assemblies 166 according to one example embodiment. In this example, the two pedal assemblies 166 are coupled to another trim assembly 200 representing an anti-torque trim assembly. In the example of FIG. 2C, pedal linkages are in mechanical communication via a rocker arm and pedal adjustment linkages. The rocker arm is operable to rotate about a point of rotation. In this example, pushing in one pedal causes the pedal adjustment linkage to rotate the rocker arm, which in turn causes the pedal adjustment linkage to push out the other pedal in an opposite direction.

In addition, rotating the rocker arm also causes a trim linkage to reposition a mechanical input associated with the anti-torque trim assembly 200. In this manner, the pilot may mechanically communicate anti-torque commands to the anti-torque trim assembly 200 by moving the pedals. Furthermore, trim linkages couple adjacent pedal assemblies 166 together such pilot pedals and co-pilot pedals are in mechanical communication.

FIG. 2D shows a trim assembly 200 according to one example embodiment. In the example of FIG. 2D, trim assembly 200 features a trim actuator 300, position measurement devices 210, mechanical stops 220, and an output shaft 230. Although shaft 230 may be described as a single shaft, teachings of certain embodiments recognize that shaft 230 may represent multiple pieces.

In operation, according to one example embodiment, output shaft 230 is in mechanical communication with a pilot input device—such as cycling control assemblies 162, collective control assemblies 164, or pedal assemblies 166—such that movement of the pilot input device results in movement of output shaft 230 and movement of output shaft 230 likewise results in movement of the pilot input device. Movement of output shaft 230 may be measured by position measurement devices 210. The measurements from measurement devices 210 may be used to instruct rotor system 100 as to how to change the position of blades 120 as well as to control movement (e.g., gradient force, soft stop, and stick shaking functions) of the pilot input devices.

Trim actuator 300 may move the pilot input device via output shaft 230 and/or react to movements of the pilot input device via shaft 230. Teachings of certain embodiments recognize that trim actuator 300 may provide functionality that replaces a variety of components, such as trim motors, clutches, dampers, and gradients (e.g., gradient springs).

As will be explained in greater detail below, trim actuator 300 may utilize magnetorheological fluid to provide force-feedback and to actively drive the pilot input device. MR fluid is a type of smart fluid that may be comprised of ferromagnetic particles dispersed in a carrier fluid, usually a type of oil. When subjected to a magnetic field, the fluid may increase its yield stress, potentially to the point of becoming a viscoplastic solid. The yield stress of the fluid when in its active ("on") state may be controlled by varying the magnetic field intensity. Accordingly, the fluid's ability to transmit force can be controlled by modulating current in an electromagnet.

Figure 2E:
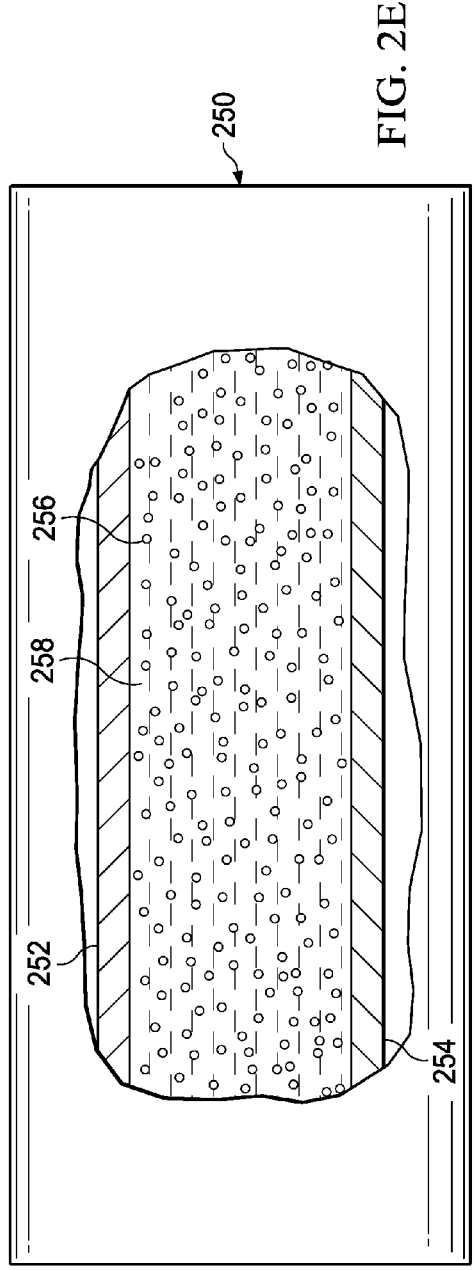
FIG. 2E shows a magnetorheological (MR) fluid device according to one example embodiment that may be incorporated into a flight control system such as the example flight control system of FIG. 2A.
Figure 2F:
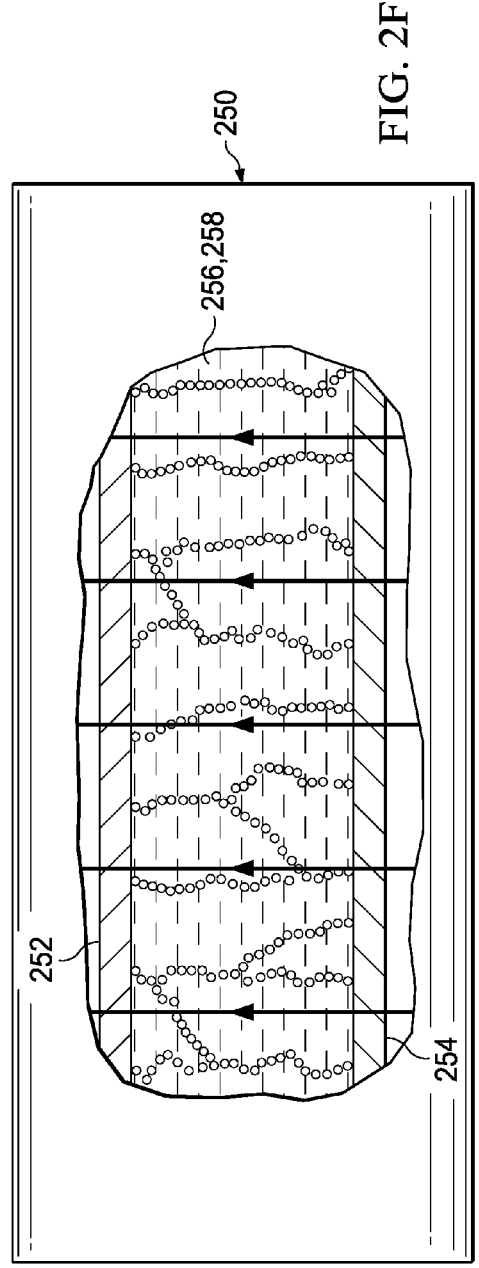
FIG. 2F shows the MR fluid device of FIG. 2B when subject to a larger magnetic flux.

An MR fluid device may provide an output in response to an input received from a pilot (or other input source, such as the flight control computer). For example, FIGS. 2E and 2F show a conception view of an MR fluid device 250. In some embodiments, MR fluid device 250 may share some features and/or characteristics with trim actuator 300. The example MR fluid device 250 features bodies 252 and 254 separated by an MR fluid comprised of ferromagnetic particles 256 disposed in a carrier fluid 258. In the example of FIGS. 2E and 2F, body 252 may be in mechanical communication with a pilot input device, and body 254 may be in mechanical communication with devices associated with rotor system 110.

FIG. 2E shows MR fluid device 250 when the MR fluid comprised of ferromagnetic particles 256 is subject to little or no magnetic flux, whereas FIG. 2F shows MR fluid device 250 when the MR fluid is subject to a larger magnetic flux. Accordingly, the example of FIG. 2E may allow increased movement between bodies 252 and 254, whereas the example of FIG. 2F may restrict movement between bodies 252 and 254.

Accordingly, MR fluid device 250 may vary the amount of force provided in response to a received input by changing the amount of magnetic flux received by ferromagnetic particles 256. In particular, MR fluid device 250 may provide an output force based on the input force by changing the amount of magnetic flux based on the input force. In addition, MR fluid device 250 may be less prone to component failures than some other actuators because ferromagnetic particles 256 and carrier fluid 258 may prevent at least some friction between bodies 252 and 254. For example MR fluid device 250 may prevent metal-to-metal contact between sliding bodies; such metal-to-metal contact could cause heat spots and concentrated wear that can lead to mechanical seizure (e.g., binding) if such contact is not prevented.

Figure 3B:
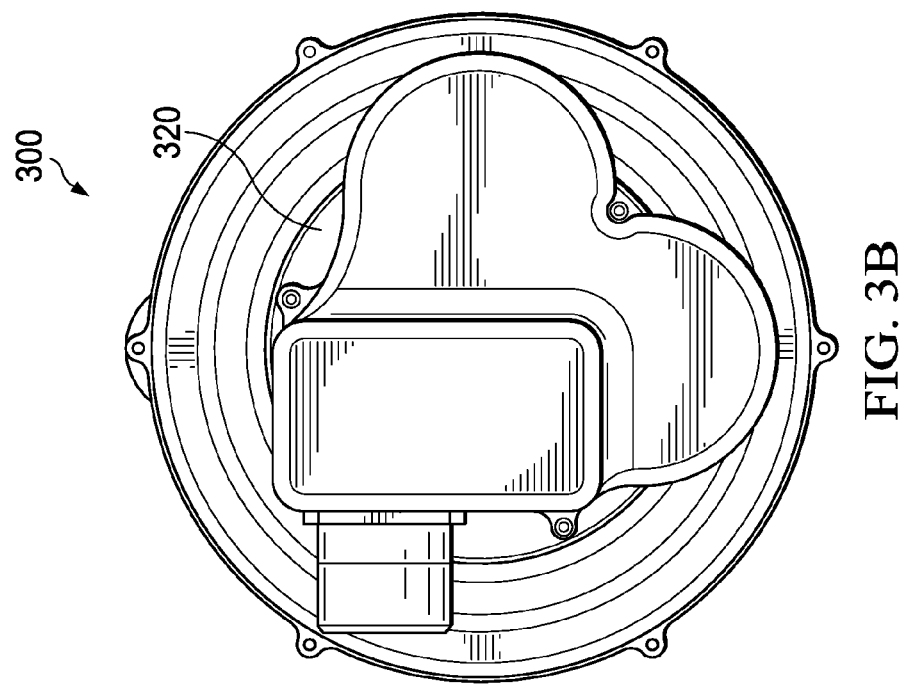
FIG. 3B shows an end view of the trim actuator of FIG. 3A.
Figure 3A:
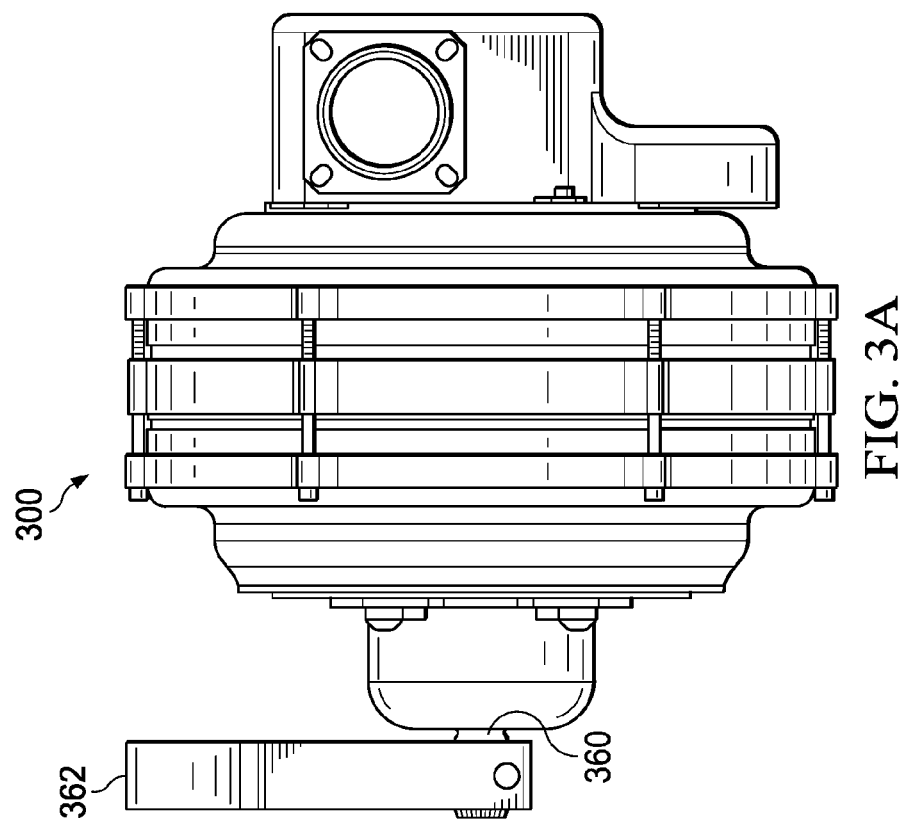
FIG. 3A shows a side view of the trim actuator of FIG. 2D according to one example embodiment.
Figure 3C:
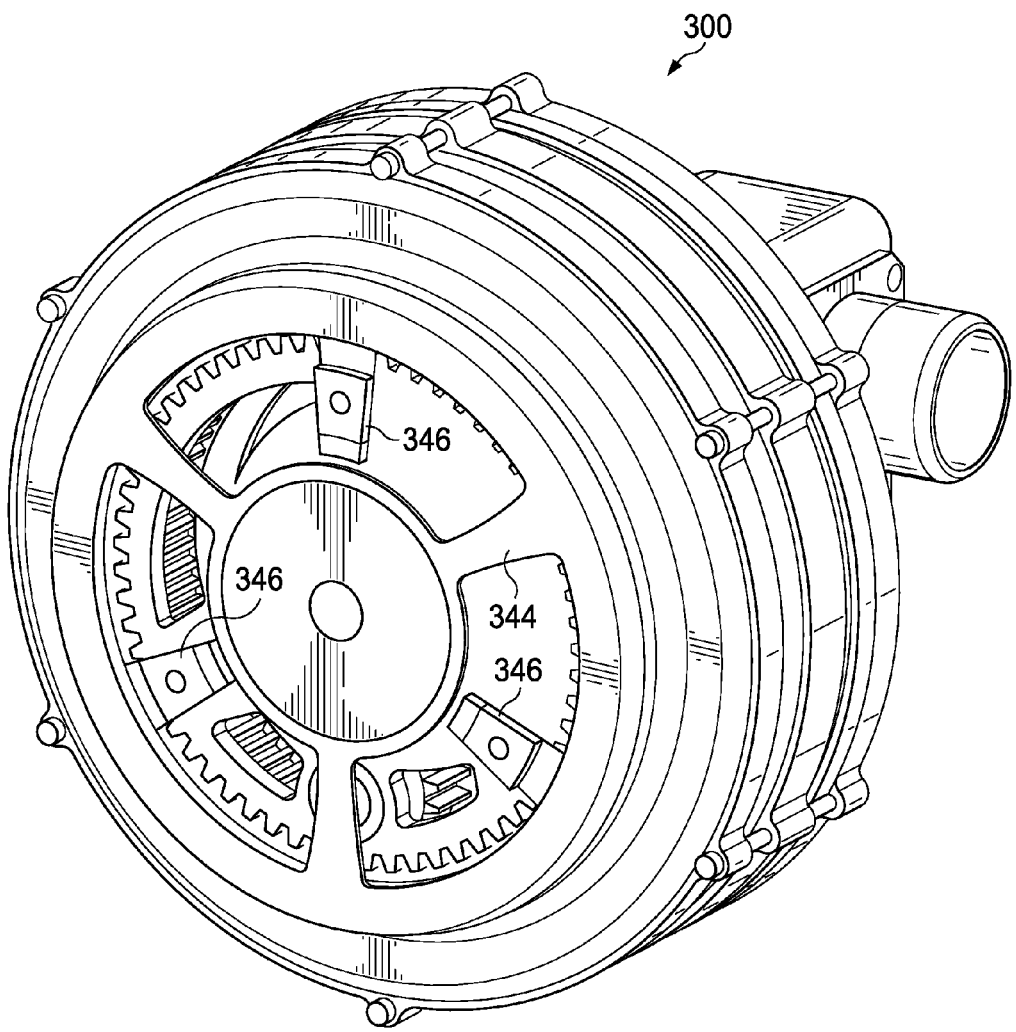
FIG. 3C shows a perspective view of the trim actuator of FIG. 3A.
Figure 3E:
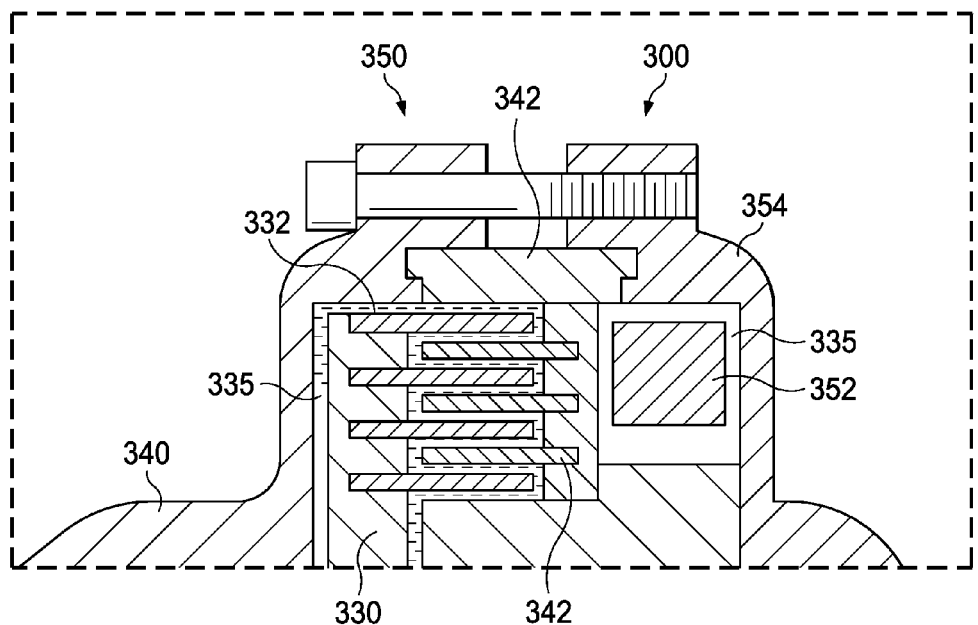
FIG. 3E shows a detailed view of the cross-section view of FIG. 3D.

Teachings of certain embodiments recognize that, like MR fluid device 250, trim actuator 300 may provide an output force by applying a working force to the output body using MR fluid. For example, FIGS. 3A-3E show trim actuator 300 according to one example embodiment. FIG. 3A shows a side view of trim actuator 300, FIG. 3B shows an end view of trim actuator 300, FIG. 3C shows a perspective view of trim actuator 300, FIG. 3D shows a cross-section side view of trim actuator 300, and FIG. 3E shows a detailed view of a section of FIG. 3D.

In the example of FIGS. 3A-3E, trim actuator 300 features a power source 310, a torsional spring 320, a driving member 330, a driven member 340, a magnetic field system 350, and an output shaft 360. MR fluid 335 (comprised of ferromagnetic particles disposed in a carrier fluid) may be disposed between driving member 330 and driven member 340.

As seen in the example of FIG. 3D, mechanical energy (torque) from power source 310 is provided to driving member 330. MR fluid 335 transmits all, some, or none of this energy from driving member 330 to driven member 340. The mechanical energy that is transferred from driving member 330 to driven member 340 causes output shaft 360 to rotate in a first direction.

Torsional spring 320 applies a force to output shaft 360 in a second direction opposite the first direction. In this manner, the force applied by torsional spring 320 opposes the force applied by driving member 330. In the example of FIG. 3D, torsional spring 320 is a mechanical spring having the ability to compress in a first direction and deflect in a second direction.

Teachings of certain embodiments recognize that use of a spring such as torsional spring 320 may reduce the overall weight of the trim actuator device. For example, U.S. patent application Ser. No. 14/609,905 teaches a trim actuator having two counter-rotating driving members, each having associated magnetic circuitry. In that trim actuator device, approximately 43% of the weight may be due to the two driving members and associated magnetic circuitry. Substantial weight savings can be achieved by eliminating one of the driving members and associated magnetic circuitry.

This weight savings, however, may have several drawbacks. For example, in some embodiments, the neutral position of the output device may correspond to a 50% position of trim actuator 300. This 50% position may correspond to where the MR force and the spring force are at equilibrium. To maintain this equilibrium, driving member 330 must continuously transmit force to driven member 340. This continuous transmission of force to maintain equilibrium may require more overall energy than a trim actuator device having two counter-rotating driving members.

In addition, trim actuator 300 may generate more heat than other devices, which may make trim actuator 300 unsuitable for certain applications or may require more equipment to improve heat dissipation. Furthermore, physical limitations of transient spring 320 may limit the response time of trim actuator 300 (at least in the direction that transient spring 320 moves output shaft 360). A trim actuator with counter-rotating driving members, on the other hand, may have an equally fast response time in both directions. Furthermore, a trim actuator with counter-rotating driving members can have a response time that is a function of the energy provided by the power source, which can be scaled up or down depending on response time needs.

Due to the physical limitations of such a spring, torsional spring 320 may have a maximum deflection position and a maximum compression position. These maximum positions may limit movement of output shaft 360. For example, magnetic field system 350 may move output shaft 360 to a first output position by minimizing the viscosity of MR fluid 335 and may move output shaft 360 to a second output position by maximizing the viscosity of the MR fluid. In this example, minimizing the viscosity of MR fluid 335 may cause driven member 340 to exert little force against output shaft 360 and allow torsional spring 320 to extend to its maximum deflection position, and maximizing the viscosity of MR fluid 335 may cause driven member 340 to exert a substantial amount of force against output shaft 360 and cause output shaft 360 to compress torsional spring 320 to its maximum compression position. Thus, in this example, the first and second output positions of output shaft 360 may represent the outer bounds of the range of motion of output shaft 360 due to the physical limitations of torsional spring 320.

Driven member 340 is in mechanical communication with output shaft 360 such that rotation of driven member 340 causes output shaft 360 to rotate output lever 362. Output lever 362 may be coupled to various mechanical components, such as to a pilot input device via output shaft 230. Position measurement devices 364 are provided to measure movement of output shaft 360; in some embodiments, position measurement devices 364 may be redundant to position measurement devices 210.

In the example of FIG. 3C, torque is transmitted from driven member 340 to output shaft 360 via torque member spokes 342. This may allow the fixed front plate to be fastened to the central housing, as shown in FIG. 3C. Front plate spacers 346 are provided with the fixed front plate to form integrated hard stops with the torque member spokes

344. In this example, front place spacers prevent torque member spokes 344 from rotating beyond a predetermined range of motion.

In operation, according to one example embodiment, movement of driven member 340 may be controlled by controlling the magnetic field intensity in the MR fluid 335 using magnetic field system 350. In general, MR fluid 335 transmits at least some rotational energy (torque) to driven member 340, thereby causing driven member 340 to rotate. Magnetic field system 350 subjects MR fluid 335 to a magnetic field that, if changed, may change the viscosity (or, specifically, the yield shear stress) of MR fluid 335. Changing the viscosity of MR fluid 335, in turn, may change the amount of rotational energy transferred from driving member 330 to driven member 340. Accordingly, in this example, the amount of rotational energy transferred to driven member 340 may be regulated by controlling the amount of magnetic field generated by magnetic field system 350.

Teachings of certain embodiments recognize that magnetic field system 350 may control the movement of driven member 340 by selectively controlling the mechanical energy transmitted from driving member 330. For example, increasing the viscosity (yield shear stress) of MR fluid 335 between driving member 330 and driven member 340 may cause driven member 340 to rotate in one direction, whereas decreasing the viscosity of MR fluid 335 between driving member 330 and driven member 340 may cause driven member 340 to rotate in the opposite direction. In this way, magnetic field system 350 may control the position of driven member 340 (and thereby output shaft 360 and output lever 362) by selectively controlling the mechanical energy transmitted from driving member 330 via MR fluid 335. In this example, the direction of rotation of driven member 340 depends on whether the force transmitted via MR fluid 335 is greater than or less than the force applied by torsional spring 320.

In the example of FIG. 3E, magnetic field system 350 features coil 352 disposed adjacent to MR fluid 335. A magnetic housing 354 is provided to guide the electromagnetic energy provided by coil 352. In the example of FIG. 3E, magnetic housing 354 is incorporated into the outer cover of trim actuator 300, such as if the right cover is made of ferromagnetic steel. In some embodiments, the outer body may be made of a different material, such as aluminum, and a different magnetic housing 354 may be provided.

In this example, the MR fluid 335 is disposed between a set of rotor drums 332, which is coupled to driving member 330, and a set of stator drums 342, which is coupled to driven member 340.

In operation, magnetic field system 350 may control the amount of rotational energy transferred from driving member 330 to driven member 340 by adjusting the magnetic fields generated by coil 352, which results in a change in viscosity (yield shear stress) of the MR fluid 335 situated between rotor drums 332 and stator drums 342. These magnetic fields may be adjusted, for example, by adjusting the amount of current that is fed to coil 352. In this way, magnetic field system 350 may control the position of driven member 340 (and thereby output shaft 360 and output lever 362) by selectively controlling the mechanical energy transmitted from driving member 330 via MR fluid 335.

Teachings of certain embodiments recognize the capability of magnetic field system 350 to control the position and movement of driven member 340 (and thereby output shaft 360, output lever 362, and the pilot input device) in a variety of ways. For example, magnetic field system 350 may move the trim position of the pilot input device by changing the viscosity (yield shear stress) of the MR fluid 335 situated between rotor drums 332 and stator drum 342 and causing driven member 340 to move to a new position.

Magnetic field system 350 may allow trim actuator 300 to modulate the force being felt by the pilot in real time. For example, teachings of certain embodiments recognize the capability to change the amount of force felt by the pilot when the pilot moves the pilot input device away from the trim position. In some embodiments, teachings recognize the capability to change the amount of force felt through the use of variable spring gradient and trim release/trim beep functionality. As another example, teachings of certain embodiments recognize the capability to superpose cueing force signals to the regular control laws in certain situations to cue the pilots for envelope limit protection. Examples of cueing signals may include, but are not limited to, soft stop, stick shaking, and viscous damping.

In some example embodiments, the pilot input device may be actively driven, such as in response to movement of the aircraft. For example, an automatic pilot unit of a flight control system may instruct the flight control system regarding how to fly the aircraft and also provide signals to trim actuator 300 on how to move the pilot input device. In this example, providing signals from the automatic pilot unit to trim actuator 300 may allow the pilot input device to maintain margin awareness during automated flight.

Figure 4:
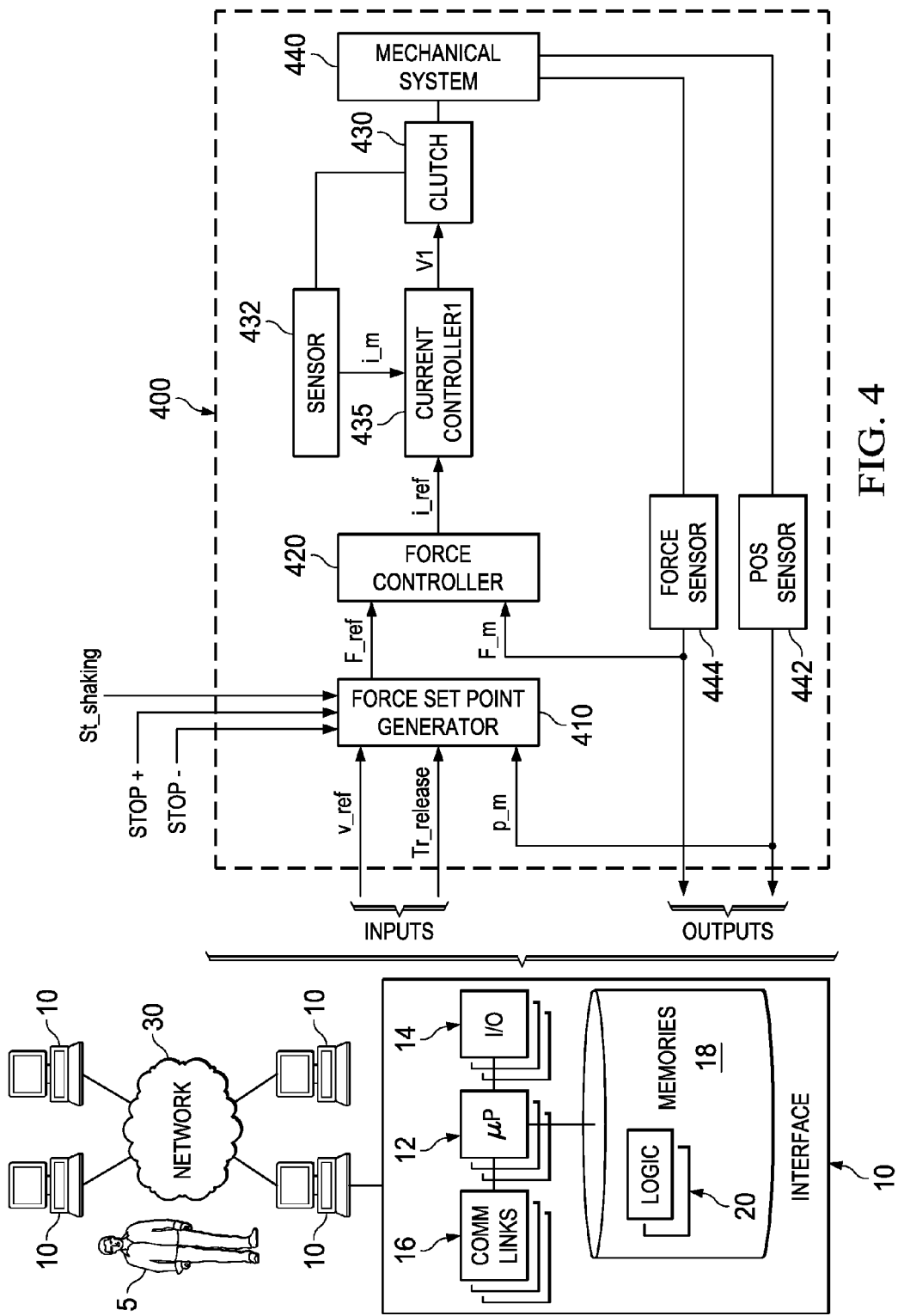
FIG. 4 shows a trim assembly control system according to one example embodiment that may work in conjunction with a trim actuator such as the trim actuator of FIGS. 3A-3E.

Overall, teachings of certain embodiments recognize the capability to customize the movement of a pilot input device in a variety of ways, including customizing how the pilot input device reacts to various pilot inputs. For example, FIG. 4 shows a trim assembly control system 400 according to one example embodiment. In the example of FIG. 4, trim assembly control system 400 features a force set point generator 410, a force controller 420, a clutch 430, sensors 432, current controller 435, a mechanical system 440, position sensors 442, and force sensors 440. In some embodiments, force set point generator 410, force controller 420, sensors 432, and current controllers 435, may represent elements of magnetic field system 350; clutch 430 may correspond to elements of trim actuator 300 such as driving member 330; mechanical system 440 may correspond to elements of trim actuator 300 such as torsional spring 320 and output shaft 360, and position sensors 442 and force sensors 440 may correspond to elements of trim actuator 300 such as position measurement devices 364.

In operation, according to one example embodiment, force controller 420 regulates the torque produced by clutch 430 in order to minimize the difference between the force being measured by force sensor 444 (F_m) connected to the actuator output lever and the force reference (F_ref) coming from force setpoint generator 410. In some alternative embodiments, trim assembly control system 400 is an open-loop control system, and the force sensor feedback loop associated with F_m is omitted. Teachings of certain embodiments recognize that an open-loop control system may be appropriate due to the reliability of system 400 after failure. In some embodiments, the force may not be expressly regulated but established, for example, by the inherent relationship between current and force.

In normal trim, F_ref may be proportional to the difference between the trim point and the measured stick position (p_m), thus replicating the behavior of the spring cartridge of a conventional trim actuator. In freewheel mode—which may be activated, for example, when the trim release (Tr_release) button is depressed—F_ref may be set to zero so the pilot feels no restriction when moving the controls.

During any of these operation modes, if a cueing signal—such as "Stop +" (max soft stop), "Stop −" (min soft stop), or "St_shaking" (stick shaking)—is sent to force setpoint generator 410, F_ref may be adapted so the actuator produces the supplementary cueing force (e.g., soft stop or stick shaking) in addition to the normal force dictated by the current operation mode.

Elements of trim assembly control system 400 may be implemented at least partially by one or more computer systems 10. All, some, or none of the components of trim assembly control system 400 may be located on or near an aircraft such as rotorcraft 100.

Users 5 may access trim assembly control system 400 through computer systems 10. For example, in some embodiments, users 5 may provide flight control inputs that may be processed using a computer system 10. Users 5 may include any individual, group of individuals, entity, machine, and/or mechanism that interacts with computer systems 10. Examples of users 5 include, but are not limited to, a pilot, service person, engineer, technician, contractor, agent, and/or employee. Users 5 may be associated with an organization. An organization may include any social arrangement that pursues collective goals. One example of an organization is a business. A business is an organization designed to provide goods or services, or both, to consumers, governmental entities, and/or other businesses.

Computer system 10 may include processors 12, input/output devices 14, communications links 16, and memory 18. In other embodiments, computer system 10 may include more, less, or other components. Computer system 10 may be operable to perform one or more operations of various embodiments. Although the embodiment shown provides one example of computer system 10 that may be used with other embodiments, such other embodiments may utilize computers other than computer system 10. Additionally, embodiments may also employ multiple computer systems 10 or other computers networked together in one or more public and/or private computer networks, such as one or more networks 30. Computer system 10 may exist wholly or partially on-board the aircraft, off-board the aircraft (e.g., in a ground station), or a combination of the two.

Processors 12 represent devices operable to execute logic contained within a medium. Examples of processor 12 include one or more microprocessors, one or more applications, and/or other logic. Computer system 10 may include one or multiple processors 12.

Input/output devices 14 may include any device or interface operable to enable communication between computer system 10 and external components, including communication with a user or another system. Example input/output devices 14 may include, but are not limited to, a mouse, keyboard, display, and printer.

Network interfaces 16 are operable to facilitate communication between computer system 10 and another element of a network, such as other computer systems 10. Network interfaces 16 may connect to any number and combination of wireline and/or wireless networks suitable for data transmission, including transmission of communications. Network interfaces 16 may, for example, communicate audio and/or video signals, messages, internet protocol packets, frame relay frames, asynchronous transfer mode cells, and/or other suitable data between network addresses. Network interfaces 16 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 18 represents any suitable storage mechanism and may store any data for use by computer system 10. Memory 18 may comprise one or more tangible, computer-readable, and/or computer-executable storage medium. Examples of memory 18 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 18 stores logic 20. Logic 20 facilitates operation of computer system 10. Logic 20 may include hardware, software, and/or other logic. Logic 20 may be encoded in one or more tangible, non-transitory media and may perform operations when executed by a computer. Logic 20 may include a computer program, software, computer executable instructions, and/or instructions capable of being executed by computer system 10. Example logic 20 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 20 may also be embedded within any other suitable medium without departing from the scope of the invention.

Various communications between computers 10 or components of computers 10 may occur across a network, such as network 30. Network 30 may represent any number and combination of wireline and/or wireless networks suitable for data transmission. Network 30 may, for example, communicate internet protocol packets, frame relay frames, asynchronous transfer mode cells, and/or other suitable data between network addresses. Network 30 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 30, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 3 of 35 U.S.C. §112 as it exists on the date of filing hereof unless the words "means for" or "step for" are explicitly used in the particular claim.

What is claimed is:

1. A rotorcraft, comprising:
   a body;
   a power train coupled to the body and comprising an engine and a drive shaft coupled to the engine;
   a rotor system coupled to the power train, the rotor system comprising at least one rotor blade;
   a pilot input device; and
   an actuator in mechanical communication with the pilot input device, the actuator comprising:
      a driving member configured to receive mechanical energy from a power source;
      a driven member;
      a magnetorheological (MR) fluid disposed between the driving member and the driven member and configured to transmit a variable amount of mechanical energy from the driving member to the driven member such that the driven member moves in a first direction;
      an output member coupled between the driven member and the pilot input device;
      a spring in mechanical communication with the output member and configured to apply a force in a second direction opposite of the first direction; and
      a magnetic circuit configured to deliver a magnetic field towards the MR fluid, the magnetic circuit configured to control movement of the pilot input device by varying the strength of the magnetic field delivered towards the MR fluid.

2. The rotorcraft of claim 1, wherein the spring is a torsional spring.

3. The rotorcraft of claim 1, wherein the magnetic circuit is configured to move the pilot input device by varying the strength of the magnetic field delivered towards the MR fluid such that the amount of energy delivered from the MR fluid to the driven member is either less than or greater than the amount of energy delivered by the spring.

4. The rotorcraft of claim 1, wherein:
   varying the strength of the magnetic field delivered towards the MR fluid changes the viscosity of the MR fluid; and
   changing the viscosity of the MR fluid changes the amount of mechanical energy transmitted from the driving member to the driven member.

5. The rotorcraft of claim 4, wherein the output member is movable between a first output position corresponding to a maximum deflection position of the spring and a second output position corresponding to a maximum compression position of the spring.

6. The rotorcraft of claim 5, wherein the magnetic circuit configured to move the output member to the first output position by minimizing the viscosity of the MR fluid and configured to move the output member to the second output position by maximizing the viscosity of the MR fluid.

7. The rotorcraft of claim 1, further comprising a housing configured to direct the magnetic field provided by the magnetic circuit towards the MR fluid.

8. The rotorcraft of claim 1, wherein the pilot input device is selected from the group consisting of a cyclic pilot input device, a collective pilot input device, an anti-torque pilot input device, a power control device, and a thrust control device.

9. The rotorcraft of claim 1, wherein the power source comprises an electric motor.

10. The rotorcraft of claim 1, further comprising a second actuator in mechanical communication with the pilot input device, the second actuator comprising:
    a second driving member configured to receive mechanical energy from a second power source;
    a second driven member;
    a second MR fluid disposed between the second driving member and the second driven member and configured to transmit a variable amount of mechanical energy from the second driving member to the second driven member in a third direction;
    an output member coupled between the second driven member and the pilot input device;
    a second spring in mechanical communication with the second output member and configured to apply a force in a fourth direction opposite of the third direction; and
    a second magnetic circuit configured to deliver a magnetic field towards the second MR fluid, the second magnetic circuit configured to control movement of the pilot input device by varying the strength of the magnetic field delivered towards the second MR fluid.

11. The rotorcraft of claim 10, wherein:
    the pilot input device comprises a cyclic pilot input device;
    the actuator is configured to move the cyclic pilot input device in a substantially longitudinal direction; and
    the second actuator is configured to move the cyclic pilot input device in a substantially lateral direction.

12. An actuator for a pilot input device, comprising:
    a driving member configured to receive mechanical energy from a power source;
    a driven member;
    a magnetorheological (MR) fluid disposed between the driving member and the driven member and configured to transmit a variable amount of mechanical energy from the driving member to the driven member such that the driven member moves in a first direction;
    an output member coupled between the driven member and a pilot input device;
    a spring in mechanical communication with the output member and configured to apply a force in a second direction opposite of the first direction; and
    a magnetic circuit configured to deliver a magnetic field towards the MR fluid, the magnetic circuit configured to control movement of the pilot input device by varying the strength of the magnetic field delivered towards the MR fluid.

13. The actuator of claim 12, wherein the spring is a torsional spring.

14. The actuator of claim 12, wherein the magnetic circuit is configured to move the pilot input device by varying the strength of the magnetic field delivered towards the MR fluid such that the amount of energy delivered from the MR fluid to the driven member is either less than or greater than the amount of energy delivered by the spring.

15. The actuator of claim 12, wherein:
    varying the strength of the magnetic field delivered towards the MR fluid changes the viscosity of the MR fluid; and changing the viscosity of the MR fluid changes the amount of mechanical energy transmitted from the driving member to the driven member.

16. The actuator of claim 15, wherein the output member is movable between a first output position corresponding to a maximum deflection position of the spring and a second output position corresponding to a maximum compression position of the spring.

17. The actuator of claim 16, wherein the magnetic circuit configured to move the output member to the first output position by minimizing the viscosity of the MR fluid and configured to move the output member to the second output position by maximizing the viscosity of the MR fluid.

18. The actuator of claim 12, further comprising a housing configured to direct the magnetic field provided by the magnetic circuit towards the MR fluid.

19. The actuator of claim 12, wherein the pilot input device is selected from the group consisting of a cyclic pilot input device, a collective pilot input device, an anti-torque pilot input device, a power control device, and a thrust control device.

20. The rotorcraft of claim 12, wherein the power source comprises an electric motor.

* * * * *